United States Patent
Knecht et al.

(10) Patent No.: US 10,666,613 B2
(45) Date of Patent: *May 26, 2020

(54) ESTABLISHING AND USING A TUNNEL FROM AN ORIGIN SERVER IN A DISTRIBUTED EDGE COMPUTE AND ROUTING SERVICE

(71) Applicant: CLOUDFLARE, INC., San Francisco, CA (US)

(72) Inventors: Dane Orion Knecht, Austin, TX (US); John Graham-Cumming, London (GB); Dani Grant, San Francisco, CA (US); Christopher Philip Branch, Romford (GB); Tom Paseka, San Francisco, CA (US)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/160,294

(22) Filed: Oct. 15, 2018

(65) Prior Publication Data

US 2019/0319919 A1    Oct. 17, 2019

Related U.S. Application Data

(63) Continuation of application No. 15/719,537, filed on Sep. 28, 2017, now Pat. No. 10,104,039.

(51) Int. Cl.
*H04L 29/12* (2006.01)
*H04L 29/08* (2006.01)
(Continued)

(52) U.S. Cl.
CPC ...... *H04L 61/2592* (2013.01); *H04L 12/4633* (2013.01); *H04L 12/4641* (2013.01);
(Continued)

(58) Field of Classification Search
CPC ..... H04L 61/2592; H04L 67/42; H04L 67/10; H04L 67/1017; H04L 61/1511;
(Continued)

(56) References Cited

U.S. PATENT DOCUMENTS 9,197,485 B1 * 11/2015 Breau ............... H04L 47/70
2010/0014518 A1    1/2010 Duncan et al.
(Continued)

OTHER PUBLICATIONS

GitHub, "Localtunnel-Server, README.md," Feb. 8, 2017, downloaded from https://github.com/localtunnel/server/blob/48475a404b632739fc1a16efb1d74e48178ab75f/README.md., 2 pages.
(Continued)

*Primary Examiner* — Will W Lin
(74) *Attorney, Agent, or Firm* — Nicholson De Vos Webster & Elliott LLP

(57) ABSTRACT

An edge server of a distributed edge compute and routing service receives a tunnel connection request from a tunnel client residing on an origin server, that requests a tunnel be established between the edge server and the tunnel client. The request identifies the hostname that is to be tunneled. An IP address is assigned for the tunnel. DNS record(s) are added or changed that associate the hostname with the assigned IP address. Routing rules are installed in the edge servers of the distributed edge compute and routing service to reach the edge server for the tunneled hostname. The edge server receives a request for a resource of the tunneled hostname from another edge server that received the request from a client, where the other edge server is not connected to the origin server. The request is transmitted from the edge server to the origin server over the tunnel.

24 Claims, 5 Drawing Sheets

(51) Int. Cl.
  *H04L 29/06* (2006.01)
  *H04L 12/46* (2006.01)
(52) U.S. Cl.
  CPC .......... *H04L 61/1511* (2013.01); *H04L 67/02*
    (2013.01); *H04L 67/10* (2013.01); *H04L*
    *67/1017* (2013.01); *H04L 67/1031* (2013.01);
    *H04L 67/42* (2013.01); *H04L 61/2007*
    (2013.01)
(58) Field of Classification Search
  CPC . H04L 12/4633; H04L 12/4641; H04L 67/02;
    H04L 67/1031; H04L 61/2007
  See application file for complete search history.

(56) References Cited

U.S. PATENT DOCUMENTS

| | | | |
|---|---|---|---|
| 2010/0232353 A1 | 9/2010 | Hu et al. | |
| 2011/0026537 A1* | 2/2011 | Kolhi | H04L 12/4633 370/401 |
| 2013/0258846 A1* | 10/2013 | Damola | H04W 80/06 370/230 |
| 2015/0381566 A1* | 12/2015 | Lohner | H04L 61/2007 709/204 |
| 2016/0050178 A1 | 2/2016 | Frydman et al. | |
| 2016/0294773 A1 | 10/2016 | Yu et al. | |
| 2017/0195161 A1* | 7/2017 | Ruel | H04L 12/4633 |

OTHER PUBLICATIONS

Mizerany B, "Simplicity and Security through Reverse Tunnels," Backplane, Feb. 8, 2017, downloaded from https://blog.backplane.io/simplicity-and-security-through-reverse-tunnels-6824d0af3196 , 7 pages.

GitHub, "Localtunnel-Client, README.md," Mar. 11, 2016, downloaded from https://github.com/localtunnel/localtunnel/blob/371db2870a52318245c3e48a8f1fbc1417de096d/README.md, 2 pages.

Notice of Allowance from U.S. Appl. No. 15/719,537, dated Jan. 24, 2018, 12 pages.

Notice of Allowance from U.S. Appl. No. 15/719,537, dated Jun. 20, 2018, 16 pages.

"Secure Introspectable Tunnels to Localhost," ngrok, inconshreveable 2017, downloaded from https://web.archive.org/web/20170129155734/hllps://ngrok.com/docs., 14 pages.

* cited by examiner

ESTABLISHING AND USING A TUNNEL FROM AN ORIGIN SERVER IN A DISTRIBUTED EDGE COMPUTE AND ROUTING SERVICE

CROSS-REFERENCE TO RELATED APPLICATIONS

This application is a continuation of U.S. application Ser. No. 15/719,537, filed Sep. 28, 2017, which is hereby incorporated by reference.

TECHNICAL FIELD

Embodiments of the invention relate to the field of network communications; and more specifically, to establishing and using a tunnel from an origin server in a distributed edge compute and routing service.

BACKGROUND ART

The internet has historically been open where content including services and applications provided by companies are exposed to the general internet. However, exposing these services and applications to the general internet may not be secure. Since any application on the internet can be a target for an attack, these companies often try to hide the origin server of their application. For example, they may use a proxy to try to mask the origin IP address and/or they may lock down ports to block unwanted traffic. In some cases, Generic Routing Encapsulation (GRE) tunneling or a Virtual Private Network (VPN) is used to secure the services and applications, and to keep their origin hidden. However, GRE tunneling and implementing a VPN is time consuming, requires cross-company coordination, and is not flexible to easily make changes.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
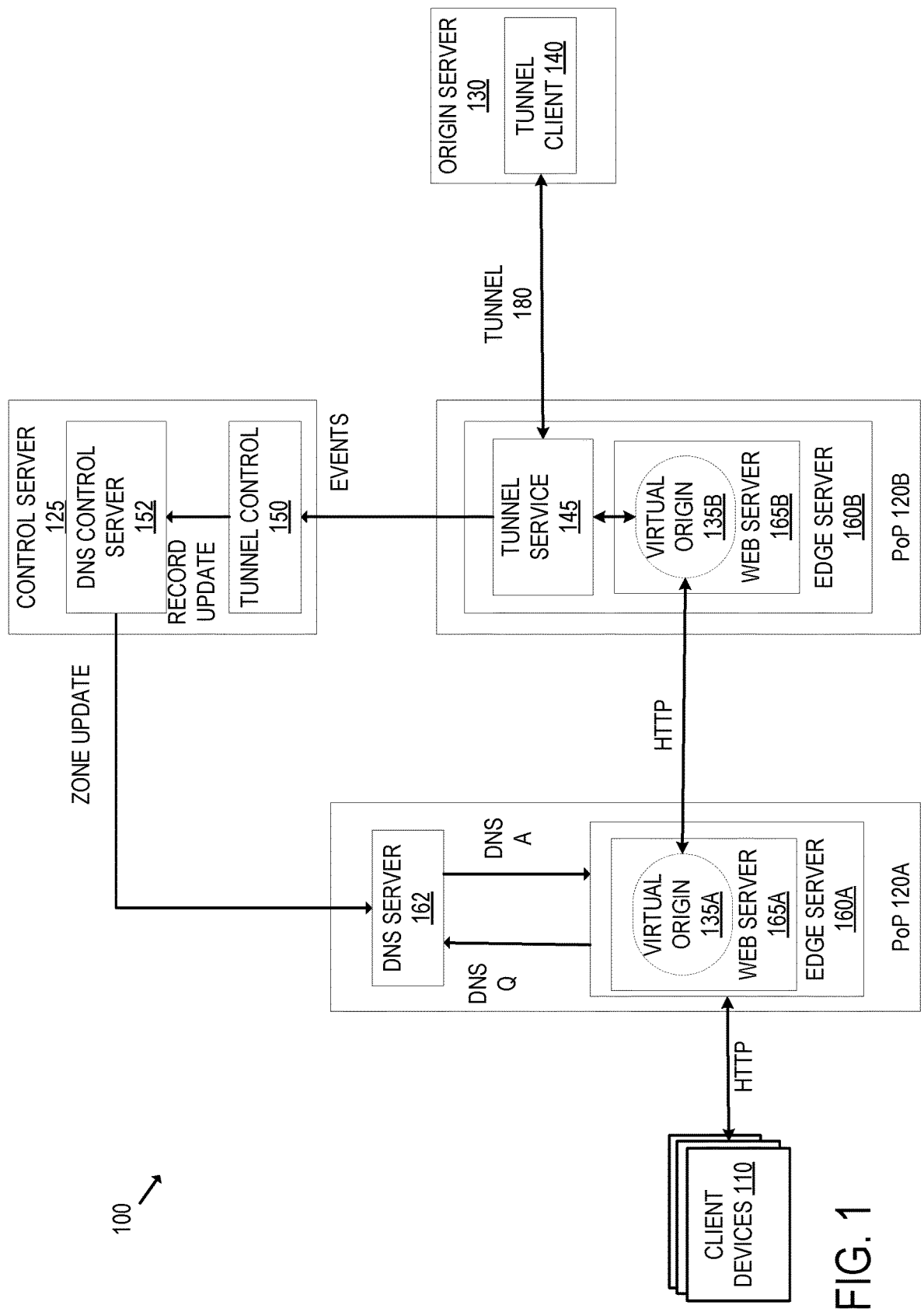
FIG. 1 illustrates an exemplary system for establishing and using a tunnel from an origin server in a distributed edge compute and routing service according to an embodiment.

A method and apparatus for establishing and using a tunnel from an origin server in a distributed edge compute and routing service is described. This allows origin servers to serve content such as applications or services through a secure tunnel to an edge server in the distributed edge compute and routing service. The content may be internal applications or services running locally on the origin server behind a firewall or NAT. An origin server can serve content by connecting to an edge server to expose that content safely to the internet without having the origin server generally exposed to the internet. This may allow for origin IP hiding, firewall traversal, and automatic DNS and load balancing configuration.

The distributed edge compute and routing service may provide different services for customers (e.g., domain owners or operators) such as protecting against internet-based threats, performance services (e.g., acting as a content delivery network (CDN) and dynamically caching customer's files closer to visitors, page acceleration/optimization), TCP stack optimizations, and/or other services. The distributed edge compute and routing service includes multiple points-of-presence (PoP) that are typically geographically distributed (e.g., in different locations throughout the world). Each PoP may include one or more servers (e.g., one or more edge servers, one or more control servers, one or more DNS servers (e.g., one or more authoritative name servers, one or more proxy DNS servers), and one or more other pieces of network equipment such as router(s), switch(es), and/or hub(s)). Each PoP may be part of a different data center and/or colocation site.

A tunnel client running on an origin server connects over a secure session to a tunnel service running on an edge server of the distributed edge compute and routing service, and requests a tunnel be established between the tunnel service and the tunnel client. This request includes configuration information that may include authentication information (e.g., username/password, an API key, cryptographic identity (e.g., a certificate), and/or email address), TLS configuration information (e.g., type of TLS supported), port, and/or hostname for which traffic will be forwarded on the tunnel. The tunnel service may forward the request to a tunnel control service for establishing the tunnel, or may establish the tunnel itself. Establishing the tunnel may include authenticating the request and configuring a DNS zone and possibly a tunnel subdomain zone (used as a CNAME target and an alternative way of accessing the tunnel). For example, a tunneled hostname may appear as a CNAME to a subdomain of a dedicated domain for the tunneling service. A unique IP address may be assigned to the tunnel. Multiple streams of data and control may be multiplexed over a single established tunnel. The edge server may also generate or receive from the tunnel control service a private key and certificate signed by an authority trusted by the web server to present when serving content from the hostname.

In an embodiment, the tunnel client connects over secure sessions to multiple tunnel services running on multiple edge servers of the distributed edge compute and routing service to request multiple tunnels be established respectively for the same hostname. An edge server that is connected to an origin server over a tunnel is referred herein as a tunneling edge server. Edge servers that are not tunneling edge servers for a hostname may receive and route traffic to the edge server(s) that are tunneling edge server(s). In an embodiment, one of the edge servers that is selected to be a tunneling edge server for an origin server is the closest to the origin server as determined by the anycast protocol. The other edge server(s) that are selected to be tunneling edge server(s) may be based on connection information of the group of possible edge servers. For instance, the group of edge servers may have different reliability information collected over time. The other edge server(s) that are selected may be those that are relatively more reliable than other edge servers. As another example, connection information may be received for the group of edge servers (e.g. bandwidth, latency, etc.). The other edge server(s) that are selected may be based on the connection information (e.g., prioritizing edge server(s) with relatively better connections as shown by the connection information than other edge servers). In an embodiment, the edge servers that are selected to be tunneling edge servers are the closest N edge servers to the origin server as determined by the anycast protocol.

If multiple tunnels for the same hostname are established, a load balancer may be created for load balancing between the tunnels. The load balancer may be automatically created for a hostname if there is an existing tunnel established for the hostname and a request for another tunnel for the hostname is received. The load balancer may create different virtual origin names for the tunneled hostname and load balance between them. The load balancer may monitor the origin servers and/or the tunnels to determine their status (e.g., if they are healthy or unhealthy). The load balancer may use one or more load balancing techniques, such as evenly distributing the load across the multiple tunnels or a group of specified tunnels (a pool of tunnels), distributing the load across the multiple tunnels using round-robin selection, distributing the load by selecting the tunnel connected to the origin server with the lowest CPU load and/or network load, distributing the load across the multiple tunnels according to the number of concurrent requests, and/or distributing the load across the multiple tunnels based on average request latency over an arbitrary time period (sending the traffic to the lowest average request latency). The load balancing may also include geographical routing where the tunneled hostname owner can configure specific traffic policies and failover ordering by geographic region. For instance, all traffic from North America can be directed to a pool of virtual origin servers located in North America and failover to a pool of virtual origin servers in Europe, and vice versa. In an embodiment, the load balancing may use data collected from the tunnel clients on different origin servers for the hostname as additional metrics for load balancing, such as CPU consumption, bytes in, bytes out, number of clients connected, status codes, response time, and/or errors.

After establishing the tunnel(s), data can be transmitted over the established tunnel(s). For instance, an edge server of the distributed edge compute and routing service may receive an HTTP request for the tunneled hostname, identify the intended origin server, and transmit the HTTP request towards, or over, the established tunnel. If an edge server is not a tunneling edge server for the tunneled hostname (it does not have a tunnel to the origin server for the tunneled hostname), that edge server determines which tunneling edge server to transmit the HTTP request and routes the traffic accordingly. In an embodiment, which will be described in greater detail later herein, the routing between edge servers and a tunneling edge server is performed intelligently based on traffic information (e.g., latency, packet loss data) gathered from other requests that traverse the distributed edge compute and routing service.

In an embodiment, multiple IP addresses are assigned to the tunnel that are announced on different carriers. For instance, a first IP address may be assigned and announced on a first carrier and a second IP address may be assigned on a second carrier. As will be described in greater detail later herein, the edge servers may route traffic between the edge servers and a tunneling edge server based on traffic information that may include carrier information (e.g., selecting one carrier from multiple carriers in which to route the traffic).

Similarly, the tunneling edge server may receive an HTTP response over the established tunnel, identify the intended recipient, and transmit the HTTP response toward the intended recipient (which may be through one or more other edge servers of the distributed edge compute and routing service).

FIG. 1 illustrates an exemplary system for establishing and using a tunnel from an origin server in a distributed edge compute and routing service according to an embodiment. In an embodiment, the system 100 includes a distributed edge compute and routing service that provides different services such as protecting against internet-based threats, providing performance services for customers (e.g., acting as a content delivery network (CDN) and dynamically caching customer's files close to visitors, page acceleration, etc.), TCP stack optimizations, and/or other services. The system 100 includes the client devices 110 that each run a client network application, the PoPs 120A and 120B, the control server 125, and the origin server 130.

Each client device is a computing device (e.g., laptop, workstation, smartphone, mobile phone, tablet, gaming system, set top box, wearable device, Internet of Things (IoT) device, etc.) that is capable of transmitting and/or receiving network traffic. Each client network application may be a web browser, native application, or other application that can access network resources (e.g., web pages, images, word processing documents, PDF files, movie files, music files, or other computer files).

The PoP 120A is situated between the client devices 110 and the PoP 120B. The PoP 120A includes the edge server 160A and the DNS server 162, and the PoP 120B includes the edge server 160B. Each PoP may be part of a different data center or colocation site. Although FIG. 1 shows two PoPs, there may be many PoPs that are geographically distributed as part of the distributed edge compute and routing service. For example, in some embodiments, multiple PoPs are geographically distributed to decrease the distance between requesting client devices and content. The DNS servers in the PoPs (e.g., the authoritative name servers, DNS proxy servers) may have the same anycast IP address, and the edge servers in the PoPs may have the same anycast IP address for a domain. As a result, when a DNS request for a domain is made, the network transmits the DNS request to the closest DNS server (in terms of the routing protocol configuration). The DNS server responds with one or more IP addresses of one or more edge servers within the PoP. Accordingly, a visitor will be bound to that edge server until the next DNS resolution for the requested hostname (according to the TTL (time to live) value as provided by the authoritative name server). In some embodiments, instead of using an anycast mechanism, a geographical load balancer to route traffic to the nearest edge service node is used. Although FIG. 1 does not show a DNS server in the PoP 120B, the PoP 120B may include one or more DNS servers like PoP 120A.

An edge server of a PoP may receive network traffic from the client devices 110 requesting network resources. For example, the web server 165A of the edge server 160A may receive requests for an action to be performed on an identified resource (e.g., an HTTP GET request, an HTTP POST request, other HTTP request methods, or other requests to be applied to an identified resource on an origin server) from a client device. The request received from the client device may be destined for an origin server (e.g., origin server 130). The web server 165A of the edge server 160A may receive the requests from client devices in several ways. In one embodiment, the request is received at the edge server 160A because the domain of the requested web page resolves to an IP address of the edge server 160A instead of the origin server 130. In such an embodiment, the domain of the web page resolves to an IP address of the edge server 160A instead of an IP address of the origin server 130. For example, if the origin server 130 handles the domain example.com, a DNS request for example.com returns an IP address of the edge servers 160 instead of an IP address of the origin server 130. In some embodiments, multiple domains that may be owned by different domain owners may resolve to the same edge server 160A (e.g., resolve to the same IP address or a different IP address of the edge server 160A). In an embodiment, the edge server 160A is one of multiple edge servers that are geographically distributed and are anycasted to the same IP address or the same set of IP address. The edge server 160A may receive the request because it is the closest server to the requesting client device 110 in terms of routing protocol configuration (e.g., Border Gateway Protocol (BGP) configuration) according to an Anycast implementation as determined by the network infrastructure (e.g., the routers, switches, or other network equipment between the requesting client device 110 and the edge server) that is not illustrated in FIG. 1 for simplicity purposes.

The origin server 130, which may be owned or operated directly or indirectly by a customer of the distributed edge compute and routing service, includes the tunnel client 140. The origin server 130 is a computing device on which a network resource resides and/or originates (e.g., web pages, images, word processing documents, PDF files movie files, music files, or other computer files). The origin server 130 includes content (e.g., an application, service, etc.) that the owner wants to secure without the content being exposed to the general internet. The content may be running locally on the origin server 130 or behind a firewall/NAT.

The tunnel client 140 connects to the edge server 160B and requests a tunnel be established between the edge server 160B and the origin server 130. In an embodiment, the tunnel client 140 connects to the edge server 150B via the anycast protocol thereby creating a connection to the closest edge server to the origin server 130. In another embodiment, the tunnel client 140 connects to the edge server 150B via a site-local address (a private address that is not globally routable) for the edge server 150B. The connection to the edge server 160B is over a secure session (e.g., Transport Layer Security (TLS), IPsec). The connection may be secured with a pinned certificate embedded in the tunnel client 140. The tunnel client 140 may be configured to send configuration information for the tunnel to the tunnel service 145. The configuration information may include authentication information (e.g., username/password, an access token (e.g., an API key), cryptographic identity (e.g., a certificate), and/or email address), TLS configuration information (e.g., type of TLS supported), port, and/or hostname that traffic should be received on. The tunnel client 140 may collect data during operation and report the collected data to the tunnel service 145 (which may in turn forward the data to the tunnel control service 150) that can be used as additional metrics for load balancing.

The tunnel service 145 on the edge server 160B accepts tunnel connection requests such as from the tunnel client 140. The tunnel service 145 sends the tunnel connection request to the tunnel control service 150 of the control server 125. The tunnel connection request may include the configuration information for the tunnel. The control server 125 is a centralized server that is connected with multiple PoPs. The tunnel service 145 may also include a communication server (e.g., a Remote Procedure Call (RPC) server, HTTP REST server, etc.), that can be used by the tunnel control service 150 to inspect, shutdown, and/or redirect tunnels. The tunnel service 145 may also communicate with the web server 165B of the edge server 160B to proxy requests for the tunnel hostname to the origin server. For instance, the tunnel service 145 may convert requests (e.g., HTTP or HTTPS requests) to HTTP/2 requests within the tunnel as identified by the hostname through Server Name Indication (SNI). The web server 165B acts as an HTTP proxy server on an internal site-local IP address, and the tunnel service 145 permits access only to the internal site-local IP address.

The tunnel control service 150 receives the tunnel connection request from the tunnel service 145, which may include the configuration information for the tunnel. The tunnel control service 150 authenticates the request, causes DNS record(s) to be created/updated, and may acquire origin CA certificates to secure the internal connection between the web server running on the edge server with the tunnel service 145. For example, the tunnel control service 150 uses the provided authentication information (e.g., username/password, an access token (e.g., an API key), and/or email address) to determine whether the request has been sent from an authorized user, and whether the tunnel control service 150 has permission to change DNS record(s) for the provided hostname. If the request is not being sent from an authorized user, then a tunnel will not be established. If the tunnel control service 150 determines to establish a tunnel, the tunnel control service 150 may configure a DNS zone and possibly a tunnel subdomain zone used as a CNAME target for the tunnel. The tunnel control service 150 may transmit a record update to the DNS control server 152 that updates the DNS zones accordingly. For instance, for the hostname to be tunneled, the tunnel control service 150 may cause a CNAME record to a subdomain of a dedicated domain for the tunneling service to be created, and a unique IP address may be assigned for the tunnel. The tunnel control service 150 may also obtain an SSL certificate (e.g., an origin CA certificate) to secure the internal connection between the web server 165B running on the edge server 160B with the tunnel service 145.

The tunnel control service 150 may send a response to the tunnel service 145 indicating any errors, the hostnames that have been configured for the tunnel, and the certificate to present when serving the hostname. The DNS control server 152 may transmit a zone update message to the DNS server 162 of the PoP 120A that reflects the DNS zone updates for the tunneled hostname. Although not illustrated in FIG. 1 for simplicity, the DNS control server 152 may transmit a zone update message to the other DNS servers of other PoPs that are not shown in FIG. 1. The connection between the control server 125 and the edge server 160B may be a secure connection (e.g., a mutually authenticated TLS connection). The tunnel control service 150 may maintain an audit log (e.g., tunnel connect and disconnect events) and/or an active tunnel table in a database or memory.

A virtual origin is created within the distributed edge compute and routing service when the tunnel is established. For instance, the virtual origin 135A and 135B is illustrated as being created logically within the web server 165A and 165B respectively. The virtual origin may have its own configuration, access rules, authentication policies, etc. For instance, the tunneled hostname owner can establish policies (e.g., allowing X number of connections per second, specifying certain routes, specifying incoming traffic from only certain IP addresses and/or IP address ranges, etc.) that are enforced at the edge servers of the distributed edge compute and routing service. The virtual origin hides the origin of the IP address of the tunneled hostname. Thus, the tunneled content does not have a public IP address and thus cannot be directly attacked. To say it another way, attacks directed to the tunneled hostname will not be received at the origin server 130, and the IP address of the origin server 130 is not otherwise exposed.

After the tunnel 180 is established, traffic may be routed between virtual origins and over the established tunnel 180. For instance, the virtual origin 135A of the HTTP proxy server 165A of the edge server 160A of the PoP 120A may receive an HTTP (or HTTPS) request from a client device 110 for the tunneled hostname. The request may be received by the edge server 160A because it is the closest edge server to the requesting client device as determined by the anycast protocol. In an alternative, instead of using an anycast mechanism, a geographical load balancer that routes traffic to the nearest edge server may cause the edge server 160A to receive the request. Since the HTTP proxy server 165A is not connected to the tunnel 180 for the hostname, the HTTP proxy server 165A routes the request toward the virtual origin 135B of the edge server 160B that is connected to the tunnel 180 for the hostname. The tunnel service 145 receives the request, identifies the intended origin (e.g., as identified through Server Name Indication (SNI)) if using HTTPS), and transmits the HTTP request over the established tunnel. For instance, the tunnel service 145 may convert requests (e.g., HTTP or HTTPS requests) to HTTP/2 requests within the tunnel as identified by the hostname through Server Name Indication (SNI). The edge server 160B may receive an HTTP response over the established tunnel, identify the intended recipient, and transmit the HTTP response toward the intended recipient. Multiple streams of data may be multiplexed over a single established tunnel.

Figure 5:
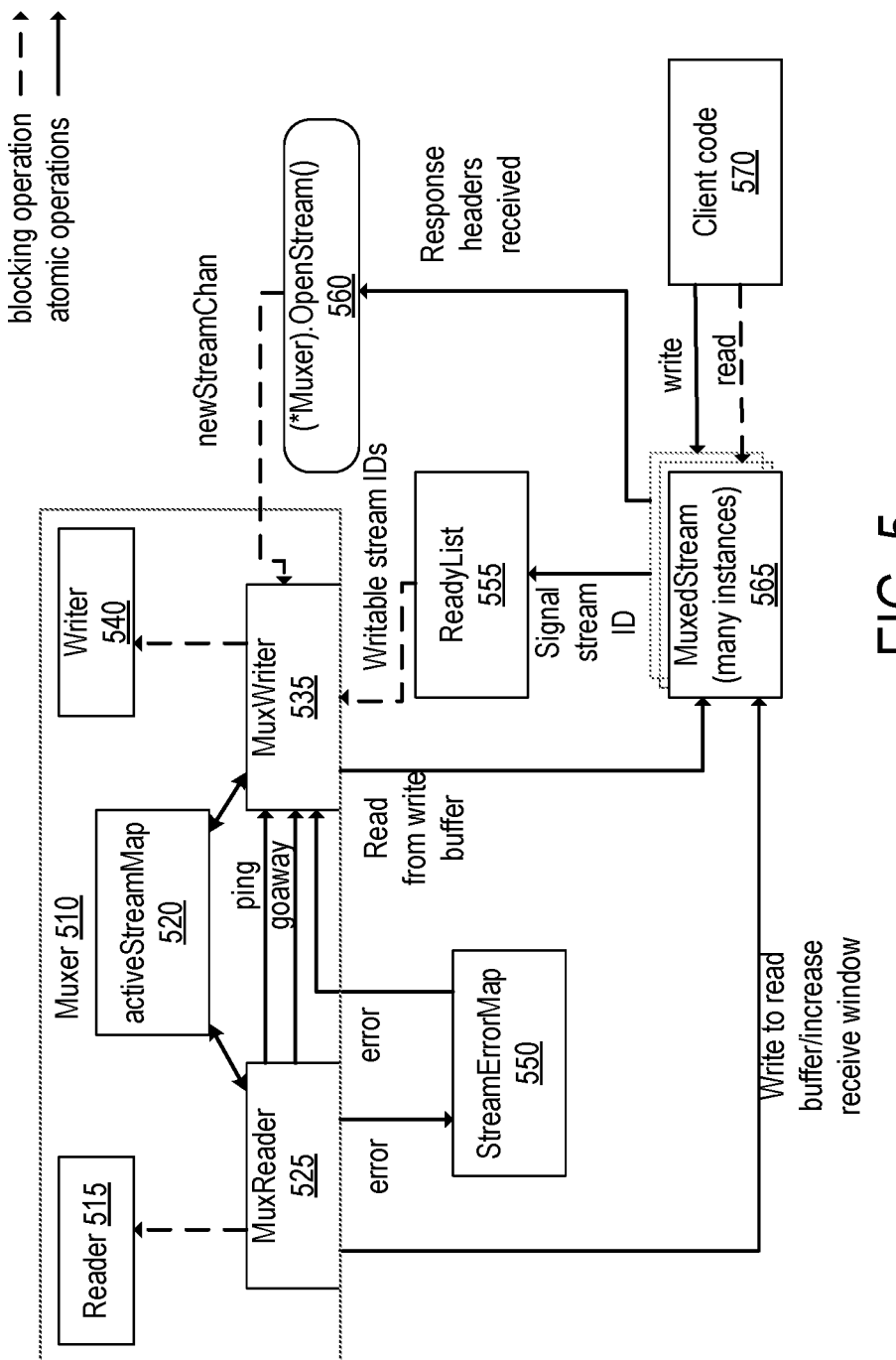
FIG. 5 is a block diagram that illustrates an exemplary implementation of a bidirectional stream multiplexer using HTTP/2 according to an embodiment.

As previously described, an established tunnel may support multiple concurrent requests over a single connection including data and control. In an embodiment, the tunnel uses a bidirectional stream multiplexer using HTTP/2. FIG. 5 illustrates an exemplary implementation of a bidirectional stream multiplexer using HTTP/2, according to an embodiment. The muxer struct 510 represents an established, multiplexed connection. The muxer 510 is created by performing a handshake on a connection (provided as a Reader 515 and Writer 540). If the handshake succeeds, the Muxer 510 is returned in a ready but idle state. To start communication, a call to Server must be performed. Each instance of MuxedStream 565 represents a single stream of the Muxer. There may be many instances of MuxedStream 565. MuxedStream 565 implements ReadWriteCloser and can be treated like an arbitrary data stream. Client code 570 writes and reads from the MuxedStream 565.

MuxedStream 565 opens new streams with an initial set of headers, and synchronously returns a MuxedStream object once the peer has sent the response headers. For example, new streams are created by MuxedStream 565 by calling OpenStream on the Muxer (represented in element 560). OpenStream 560 requires a slice of response headers and an optional request body (e.g., http.Request). If successful, the result is a MuxedStream object back with the response headers, and reading and writing may begin.

The MuxReader 525 implements the read end of the connection. It receives control and data messages, adjusts the connection, and pushes data into MuxedStream objects. It has one-way communication with MuxWriter 535 to inform the remote side of errors or to acknowledge certain frames. The MuxWriter 535 implements the write end of the connection. It processes control messages and flushes MuxedStream write buffers when there is data to send and the remote receive window is non-empty.

As illustrated in FIG. 5, some operations (particularly I/O operations) are blocking operations. To account for blocking operations, the MuxReader 525 notifies the MuxWriter 535 to service a request at its convenience, and coalesce requests if one is outstanding (through pings), GOAWAY (to initiate a shutdown of a connection or to signal serious error condition), and through use of the StreamErrorMap 550. Both the MuxReader 525 and the MuxWriter 535 can add, retrieve, and close streams as atomic operations. The MuxReader 525 and the MuxWriter 535 do not synchronize with client routines, and do not hold locks while performing I/O.

The activeStreamMap 520 is an abstraction over the set of currently active streams. For example, the activeStreamMap 520 may be a concurrent map holding a pointer to each MuxedStream instance by its stream ID. The activeStreamMap 520 allows the MuxReader 525 and the MuxWriter 535 to atomically access and manipulate independent streams. The activeStreamMap 520 supports allocation of new streams including the ability to block the creation of new streams when shutting down a connection. The activeStreamMap 520 tracks two key values for the HTTP/2 protocol: the highest stream IDs created locally and by the peer. When creating a new stream, the next highest ID is acquired atomically. When receiving a HEADERS frame from the peer for a new stream, a verification of the ID is performed to determine if the ID is legal according to the protocol. The activeStreamMap 520 handles graceful shutdown by rejecting requests for new streams, and signaling when the last stream has been closed.

The StreamErrorMap 550 is a concurrent map holding the most recently-raised error for each stream ID. This exists separately to activeStreamMap 520 as errors can be raised against messages with arbitrary stream IDs. When at least one error has been raised, the StreamErrorMap 550 raises a signal that the MuxWriter 535 thread or process waits on. After receiving the signal, the MuxWriter 535 atomically extracts all errors raised so far, resetting the StreamErrorMap 550.

The ReadyList 555 offers a fan-in channel for multiple signals. This is used by the MuxedStream 565 to indicate that there is new writable data for the MuxWriter 535 to process. Whenever a writable event occurs, the ReadyList 555 is signaled with the stream ID. A routine enqueues the signal, and sends it on the ReadyChannel consumed by the MuxWriter 535. Unsent signals for a stream are deduplicated. First-in First-Out (FIFO) is used to avoid stream starvation caused by a single high-bandwidth stream monopolizing the MuxWriter 535. For instance, for a single writable event, the largest transmissible block of data may be atomically dequeued from the stream, after which the stream is no longer writable. This transmission occurs independently of requests from the peer for more data on that stream, such that when the request for more data is received by MuxReader 525 in parallel, the stream is enqueued into the ReadyList 555 to be processed after all currently writable and pending streams have been processed.

Figure 2:
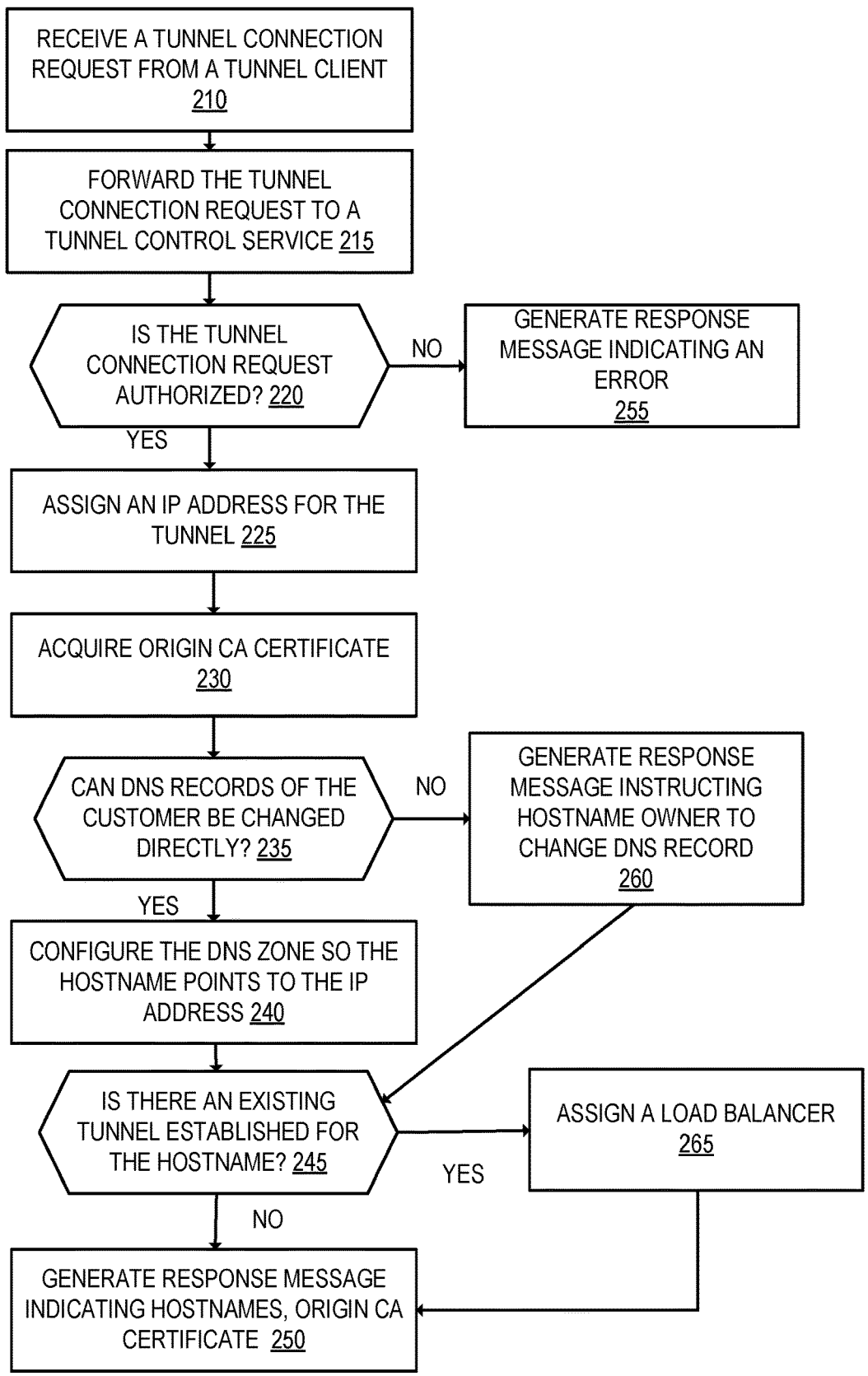
FIG. 2 is a flow diagram that illustrates exemplary operations for establishing a tunnel to an edge server in a distributed edge compute and routing service according to an embodiment.

FIG. 2 is a flow diagram that illustrates exemplary operations for establishing a tunnel to an edge server in a distributed edge compute and routing service according to an embodiment. The operations of FIG. 2 will be described with respect to the exemplary embodiment of FIG. 1. However, the operations of FIG. 2 can be performed by different embodiments than those of FIG. 1, and FIG. 1 can perform operations different than those of FIG. 2.

At operation 210, the tunnel service 145 receives a tunnel connection request from the tunnel client 140. The tunnel connection request may include the configuration information for the tunnel including authentication information (e.g., username/password, an access token (e.g., an API key), cryptographic identity (e.g., a certificate), and/or email address), TLS configuration information (e.g., type of TLS supported), port, and/or hostname for the tunneled traffic. The tunnel connection request may be received over a secure session (e.g., a TLS connection), that may be secured with a pinned certificate embedded into the tunnel client 140. In an embodiment, the tunnel client 140 may expose an interface (e.g., a command line interface, a graphical user interface) to allow the hostname owner to make the request. For example, the following command may be input on the tunnel client 140 to request a tunnel be created for the hostname "tunnel.example.com":<cftunnel-http hostname=tunnel.example.com-authtoken=<api-key>, email@example.com 8000>.

Next, at operation 215, the tunnel service 145 forwards the tunnel connection request including the configuration information to the tunnel control service 150. The connection between the tunnel service 145 and the tunnel control service 150 may be secured using mutually authenticated TLS. The tunnel control service 150 receives the tunnel connection request from the tunnel service 145. Although FIG. 2 describes forwarding the tunnel connection request to the tunnel control service 150, in another embodiment, the tunnel service 145 performs the operations of FIG. 2 without interaction with the tunnel control service 150.

Next, at operation 220, the tunnel control service 150 determines whether the tunnel connection request is authorized. The tunnel control service 150 may use the provided authentication information to determine whether the tunnel connection request is being received from a user that is authorized to make a connection. If the tunnel connection request is not authorized, then flow moves to operation 255 where the tunnel control service 150 generates a response message indicating an error of an unauthorized request. This response message can be forwarded to the tunnel service 145 that forwards this response message to the tunnel client 140. If the tunnel connection request is authorized, then flow moves to operation 225.

At operation 225, the tunnel control service 150 assigns an IP address to the tunnel. In an embodiment, a unique IP address (e.g., an IPv6) address is assigned to the tunnel. The IP address may be anycasted and/or selectively anycast to distribute connections to multiple PoPs. In an embodiment, multiple IP addresses are assigned to the tunnel that are announced on different carriers. For instance, a first IP address may be assigned and announced on a first carrier and a second IP address may be assigned on a second carrier. As will be described in greater detail later herein, the edge servers may route traffic between the edge servers and a tunneling edge server based on traffic information that may include carrier information (e.g., selecting one carrier from multiple carriers in which to route the traffic).

Next, at operation 230, the tunnel control service 150 acquires an origin CA certificate to secure the internal connection between the web server 165B and the tunnel service 145. The origin CA certificate is a certificate that may be created and signed by the distributed edge compute and routing service, or may be provided by the owner of the tunneled hostname. To acquire the origin CA certificate, if one is already established by the owner of the tunneled hostname, the tunnel control service 150 may use the access token (e.g., an API key) provided with the tunnel connection request to acquire the origin CA certificate. If an origin CA certificate is not established, the tunnel control service 150 may cause the prompting to the tunnel requester to create and/or submit an origin CA certificate.

The tunnel control service 150 determines whether the DNS records of the customer can be directly changed by the distributed edge compute and routing service, at operation 235. For example, the tunnel control service 150 can cause the DNS records of the customer to be updated if the customer previously gave permission to change its DNS records on its behalf. In one embodiment, the access token (e.g., an API key) that may be provided with the tunnel connection request may be used for registering the tunnels on the customer zone. If the tunnel control service 150 can change the DNS records of the customer directly, then flow moves to operation 240; otherwise flow moves to operation 260.

At operation 240, the tunnel control service 150 causes the DNS zone to be configured so the tunneled hostname points to assigned IP address(es) to the tunnel. For instance, the tunnel control service 150 may send a record update message to the DNS control server 152 that causes a DNS record for the tunneled hostname to be created and point to the assigned IP address(es). In an embodiment, the tunnel control service 150 may cause a CNAME record to a subdomain of a dedicated domain for the tunneling service to be created and point to the assigned IP address(es). For instance, if the tunneled hostname is "tunnel" for the domain "example.com", a CNAME record for the hostname "tunnel" may point to a random subdomain of a dedicated domain for the tunneling service (e.g., ab1489903c3ed159.cftunnel.com), and the random subdomain of the dedicated domain for the tunneling service points to the assigned IP address(es). In such a case, the tunnel may be accessed by using the random subdomain of the dedicated domain or the tunneled hostname. The random subdomain may be a string of N length that is a hash or salted hash of the hostname so that it is unique and constant per hostname. The DNS control server 152 in turn causes a zone update message to be transmitted to the DNS server 162 and the other DNS servers of the distributed edge compute and routing service that reflects the tunnel registration. Flow then moves to operation 245.

If the tunnel control service 150 cannot change the DNS records on behalf of the customer, then at operation 260, the tunnel control service 150 generates a response message instructing the tunneled hostname owner to update the DNS record corresponding to their designed hostname accordingly. For example, the response message may include the random subdomain of the dedicated domain and instruct the hostname owner to create or update a CNAME record for the tunneled hostname to point to the random subdomain of the dedicated domain. The tunnel control service 150 still updates the DNS zone such that the random subdomain of the dedicated domain points to the assigned IP address(es) of the tunnel. Flow then moves to operation 245.

In an embodiment, the tunneling service supports multiple tunnels for a single hostname. A user of the service may want multiple tunnels for multiple backends of the origin server (e.g., if providing the same content on multiple origin servers). Multiple tunnels may be useful for load balancing across the multiple tunnels and/or to provide high availability (e.g., to account for failure of an edge server and/or an origin server). The multiple tunnels may connect a tunnel client to multiple instances of the tunnel service on the same physical edge server or across multiple edge servers. The multiple tunnels may be from the same origin server to multiple edge servers, from multiple origin servers to the same edge server, and/or from multiple origin servers to multiple edge servers.

At operation 245, the tunnel control service 150 determines whether there is an existing tunnel already established for the hostname. The tunnel control service 150 may access a data structure that stores information about existing tunnels when determining whether there is an existing tunnel established for the hostname. If there is not an existing tunnel established for the hostname, flow moves to operation 250. If there is an existing tunnel established for the hostname, then flow moves to operation 265 where the tunnel control service 150 causes a load balancer to be created to load balance between the multiple tunnels. The load balancer may create different virtual origin names for the tunneled hostname and load balance between them. The load balancer may monitor the origin servers and/or the tunnels to determine their status (e.g., if they are healthy or unhealthy). The load balancer may use one or more load balancing techniques, such as evenly distributing the load across the multiple tunnels or a group of specified tunnels (a pool of tunnels), distributing the load across the multiple tunnels using round-robin selection, distributing the load by selecting the tunnel connected to the origin server with the lowest CPU load and/or network load, distributing the load across the multiple tunnels according to the number of concurrent requests, and/or distributing the load across the multiple tunnels based on average request latency over an arbitrary time period (sending the traffic to the lowest average request latency).

The load balancing may also include geographical routing where the tunneled hostname owner can configure specific traffic policies and failover ordering by geographic region. For instance, all traffic from North America can be directed to a pool of virtual origin servers located in North America and failover to a pool of virtual origin servers in Europe, and vice versa.

In an embodiment, the load balancing may use data collected from the tunnel clients on different origin servers for the hostname as additional metrics for load balancing. For example, the tunnel client may include an agent that can collect statistics of the origin server and/or the tunnel such as CPU consumption, bytes in, bytes out, number of clients connected, status codes, response time, and/or errors. By way of example, the load balancing may load balance between different tunnels to different origin servers for underutilized origin servers and/or overutilized origin servers according to the collected statistics (e.g., move traffic from a burdened server to a less burdened server). Flow moves from operation 265 to operation 250.

At operation 250, the tunnel control service 150 generates a response message indicating the errors, the hostname that has been configured for the tunnel, and the origin CA certificate to present when serving the hostname, and transmits the response message to the tunnel service 145. The tunnel service 145 may then transmit the response to the tunnel client 140. The tunnel service 145 is configured with an internal mapping that maps the tunneled hostname to the established tunnel with the tunnel client 140. The tunnel client 140 is configured with the URL of the origin web server that the tunnel will forward traffic to, which is usually the localhost of the origin server 130.

Figure 3:
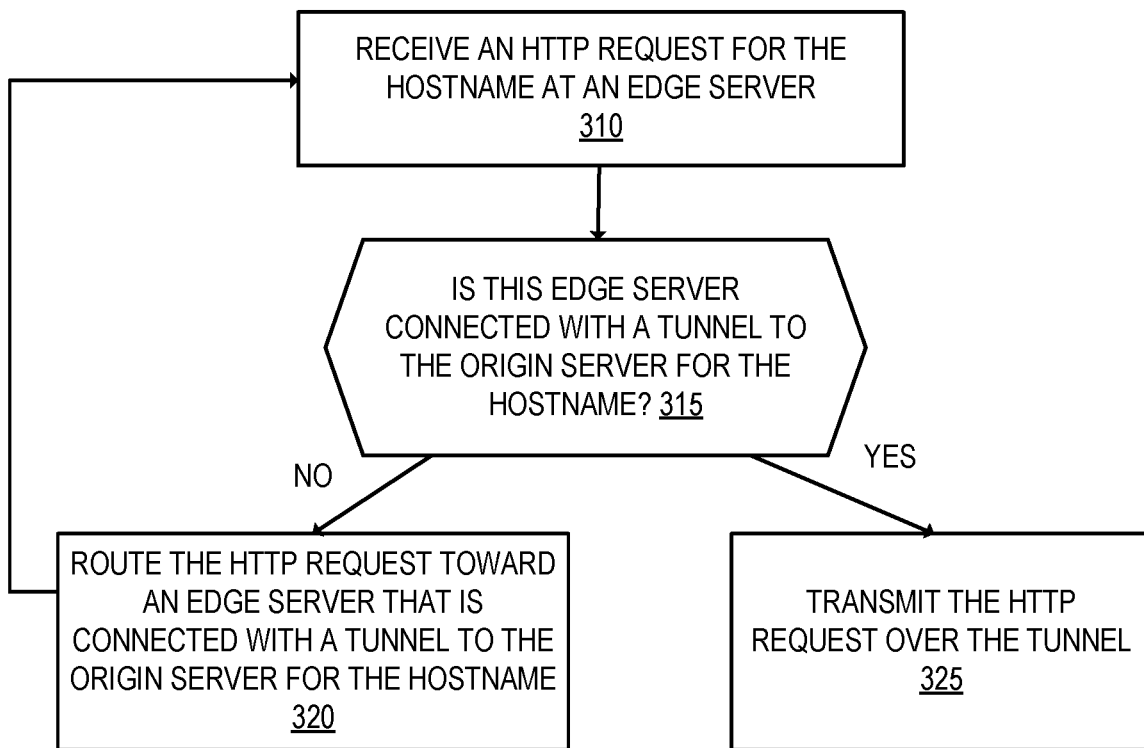
FIG. 3 is a flow diagram that illustrates exemplary operations for using a tunnel established in a distributed edge compute and routing service according to an embodiment.

After establishing a tunnel, traffic for the application or services running on the origin server for the tunneled hostname may be transmitted over the tunnel. FIG. 3 is a flow diagram that illustrates exemplary operations for using a tunnel established in a distributed edge compute and routing service according to an embodiment. The operations of FIG. 3 will be described with respect to the exemplary embodiment of FIG. 1. However, the operations of FIG. 3 can be performed by different embodiments than those of FIG. 1, and FIG. 1 can perform operations different than those of FIG. 3. The operations of FIG. 3 will be described with respect to HTTP and/or HTTPS. However, the tunnel may be used for other protocol types including protocols implemented atop TCP and UDP, or any other protocol type.

At operation 310, an edge server of the distributed edge compute and routing service receives a request from a client network application of a client computing device for an action to be performed on a resource handled by the tunneled hostname origin server 130. The request may be an HTTP or HTTPS request. The request may be received at the edge server because of a DNS request for the hostname returning an IP address assigned to the tunneled hostname (as described previously) instead of the IP address of the hostname on the origin server 130. The edge server may determine whether the name included in the SNI matches the name of the HTTP request's host header, and block the request if there is a mismatch (if the request is blocked, then the further operations of FIG. 3 are not performed).

Next, at operation 315, the edge server determines if it is a tunneling edge server for the tunneled hostname. For example, the edge server that receives the request determines whether it has a tunnel to the origin server 130 for the hostname. As shown in FIG. 1, the edge server 160A is not a tunneling edge server for the hostname, and the edge server 160B is a tunneling edge server for the hostname because of the tunnel 180 between the tunnel service 145 and the tunnel client 140. As previously described, the distributed edge compute and routing service includes multiple edge servers that are typically geographically distributed that may each receive HTTP requests from client computing devices, which may depend on the geographic location of the client computing devices. Some of these edge servers may have a tunnel for the hostname and some may not. If the edge server that receives the request is a tunneling edge server for the tunneled hostname (it has a tunnel connected to the origin server for the hostname), then flow moves to operation 325. If the edge server that receives the request is not a tunneling edge server for the tunneled hostname, then flow moves to operation 320.

At operation 320, the edge server routes the HTTP request toward the edge server that is connected with a tunnel from the origin server for the hostname. With respect to FIG. 1, the edge server 160A forwards the HTTP request toward the edge server 160B. Although not illustrated in FIG. 1, the request could be routed inside different devices and/or virtual machines in the PoP. Flow then moves back to operation 310. Although not illustrated in FIG. 1 for simplicity, there may be many edge servers (along with other network equipment) between the edge server that initially receives the request and a tunneling edge server. For instance, if an origin server is in London and a tunnel is created from an edge server in London to the origin server, and a request is being sent from a client computing device in California that is received at an edge server in California, the request may be routed over multiple edge servers between California and London.

In conjunction with establishing a tunnel, routing rules are installed in the edge servers of the distributed edge compute and routing service to reach the first one of the plurality of edge servers for the tunneled hostname. In an embodiment, the routing between edge server(s) and a tunneling edge server is performed intelligently based on traffic information (e.g., latency, packet loss data) gathered from other requests that traverse the distributed edge compute and routing service. This allows the distributed edge compute and routing service to pick the best path to the origin (e.g., the fastest, most reliable, etc.) depending on current network conditions.

In an embodiment, the routing between edge server(s) and a tunneling edge server is based on carrier information. For example, some of the IP address(es) assigned to the tunnel may be from different carriers that may have different routes that can be taken through the distributed edge compute and routing service. The routing may find the optimal path to the origin based on which carrier is selected for the routing, which may be based on factors such as speed, reliability, and/or cost. For instance, the prices of different cloud providers can be monitored (the prices can change relatively quickly depending on demand and sales) and the cheaper route can be taken.

Before determining to transmit the request to another edge server or to the origin server, in an embodiment, the receiving edge server determines whether the requested resource is available in cache. If the requested resource is available in cache, then the receiving edge server may respond to the requesting client device with the requested resource without querying the origin server or another edge server. If the requested resource is not available in cache, in an embodiment the receiving edge server determines if the requested resource is available in cache in a different edge server. If it is, that different edge server can respond with the requested resource to the receiving edge server which can then respond to the requesting client device with the requested resource, and cache the requested resource for responding to future requests. If the network resource is not available in cache on any edge server, then the operations 315-325 may be performed.

At operation 325 (the edge server is a tunneling edge server), the edge server transmits the HTTP request over the tunnel. For instance, the tunnel service 145 may convert requests (e.g., HTTP or HTTPS requests) to HTTP/2 requests within the tunnel as identified by the hostname through SNI. Although not illustrated in FIG. 1 for simplicity, the tunnel supports multiple data connections and control connections.

Figure 4:
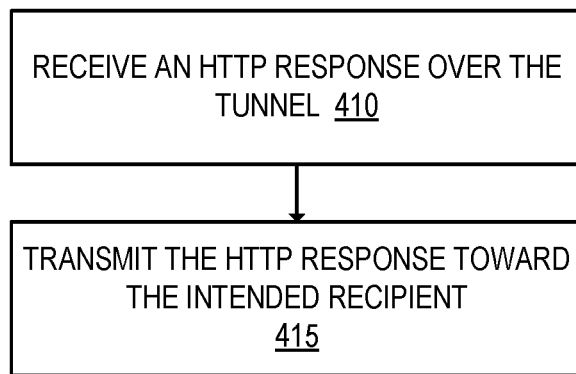
FIG. 4 is a flow diagram that illustrates exemplary operations for using a tunnel established in a distributed edge compute and routing service according to an embodiment.

FIG. 4 is a flow diagram that illustrates exemplary operations for using a tunnel established in a distributed edge compute and routing service according to an embodiment. The operations of FIG. 4 will be described with respect to the exemplary embodiment of FIG. 1. However, the operations of FIG. 4 can be performed by different embodiments than those of FIG. 1, and FIG. 1 can perform operations different than those of FIG. 4. The operations of FIG. 4 will be described with respect to HTTP and/or HTTPS. However, the tunnel may be used for other protocol types including protocols implemented atop TCP and UDP, or any other protocol type.

At operation 410, a tunneling edge server receives a response over the tunnel (e.g., an HTTP response). For instance, the tunnel service 145 receives a response from the tunneled hostname over the tunnel 180. Next, at operation 415, the tunneling edge server transmits the HTTP response toward the intended recipient (e.g., the corresponding requesting client computing device). The response may be routed back the opposite way the request was routed to the tunneling edge server. Any edge servers along the path may cache the resource as the resource travels through.

Embodiments described herein allows a website owner to server content such as applications or services through a secure tunnel to an edge server in the distributed edge compute and routing service. Traffic to the content is only able to find and access the origin server through the distributed edge compute and routing service. Thus, traffic is not received at the origin for the content directly because the origin is not exposed to the general internet. This protects the content and the origin server. Because the distributed edge compute and routing service may be configured to drop unwanted traffic at the edge server (e.g., according to the policies set by the tunneled hostname owner), only traffic that has been validated by the distributed edge compute and routing service is received at the origin sever.

Figure 6:
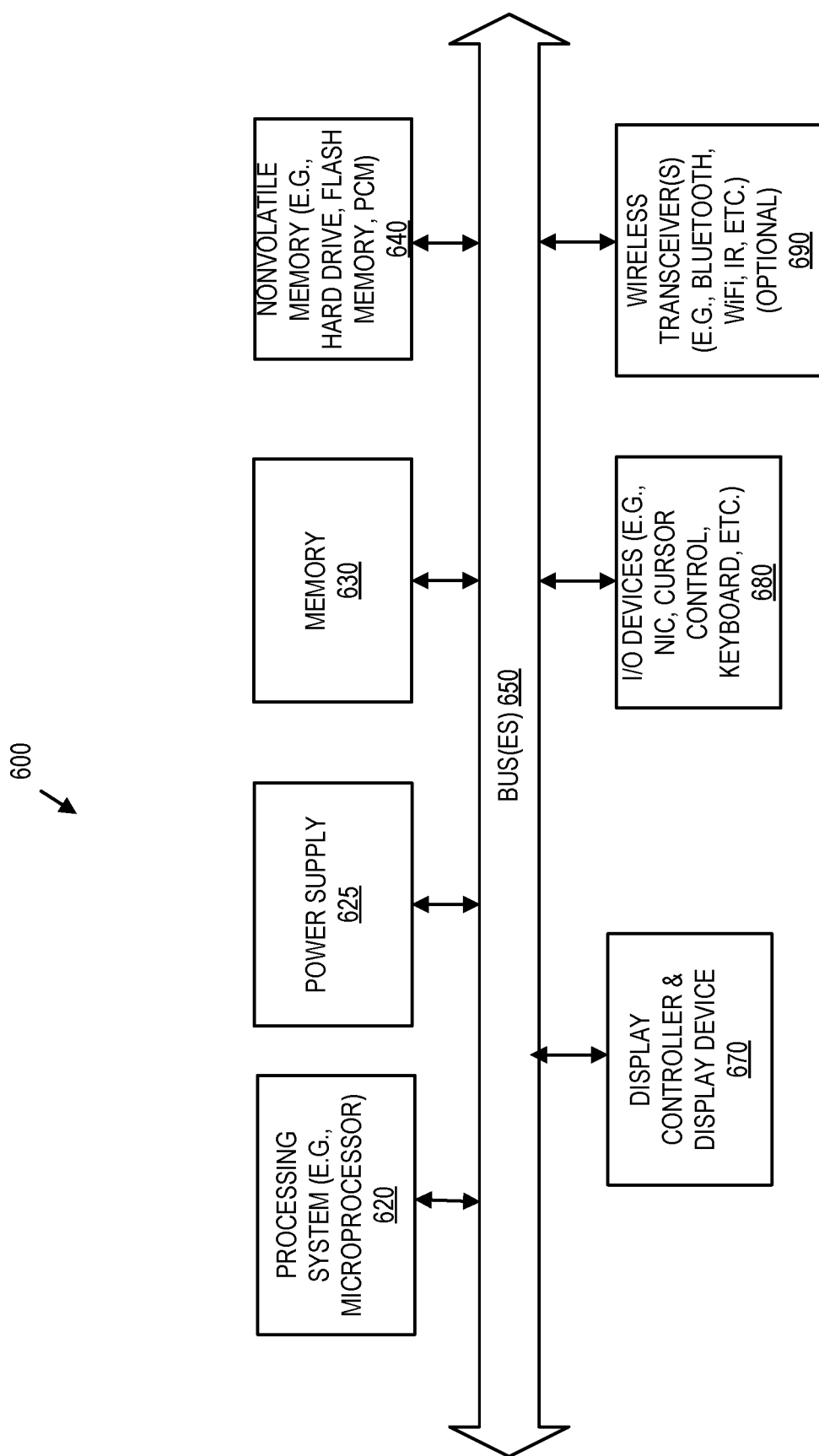
FIG. 6 illustrates an exemplary computer device that can be used in some embodiments.

FIG. 6 illustrates an exemplary computer device 600 that can be used in some embodiments. The computer device 600, which is a form of a data processing system, includes the bus(es) 650 which is coupled with the processing system 620, power supply 625, memory 630, and the nonvolatile memory 640 (e.g., a hard drive, flash memory, Phase-Change Memory (PCM), etc.). The bus(es) 650 may be connected to each other through various bridges, controllers, and/or adapters as is well known in the art. The processing system 620 may retrieve instruction(s) from the memory 630 and/or the nonvolatile memory 640, and execute the instructions to perform operations described herein. The bus 650 interconnects the above components together and also interconnects those components to the display controller & display device 670, Input/Output devices 680 (e.g., NIC (Network Interface Card), a cursor control (e.g., mouse, touchscreen, touchpad, etc.), a keyboard, etc.), and the optional wireless transceiver(s) 690 (e.g., Bluetooth, WiFi, Infrared, etc.). One or more of the components illustrated in FIG. 6 may be optional in some implementations. In one embodiment, the client device, edge server, DNS server, control server, and/or the origin server described herein may take the form of the computer device 600.

The techniques shown in the figures can be implemented using code and data stored and executed on one or more computing devices (e.g., client device, edge server, DNS server, control server, origin server, etc.). Such computing devices store and communicate (internally and/or with other computing devices over a network) code and data using machine-readable media, such as non-transitory machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

In the preceding description, numerous specific details are set forth. However, it is understood that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for establishing and using a tunnel in a distributed edge compute and routing service, the method comprising:
    assigning a first IP address for a first tunnel between a first one of a plurality of edge servers of the distributed edge compute and routing service and a first tunnel client residing on a first origin server;
    causing a Domain Name System (DNS) record to be added or changed that associates a hostname to be tunneled with the assigned first IP address for the first tunnel;
    installing routing rules in the plurality of edge servers to reach the first one of the plurality of edge servers for the tunneled hostname;
    receiving, at the first one of the plurality of edge servers, a request for an action to be performed on a resource of the tunneled hostname handled by the first origin server, wherein the first one of the plurality of edge servers receives the request from a second one of the plurality of edge servers that received the request from a client network application, and wherein the second one of the plurality of edge servers is not connected to the first origin server for the tunneled hostname; and
    transmitting the request from the first one of the plurality of edge servers to the first origin server over the first tunnel.

2. The method of claim 1, wherein prior to transmitting the request over the first tunnel, converting the request to an HTTP/2 request.

3. The method of claim 1, further comprising:
    receiving a first tunnel connection request that requests the first tunnel be established between the first one of the plurality of edge servers and the first tunnel client, wherein the first one of the plurality of edge servers is selected to receive the first tunnel connection request based on the first one of the plurality of edge servers being closest to the first origin server as determined by an implementation of an anycast protocol.

4. The method of claim 3, wherein the first tunnel connection request is received in response to a user interaction with an interface element of a graphical user interface.

5. The method of claim 1, further comprising:
    receiving a first tunnel connection request that requests the first tunnel be established between the first one of the plurality of edge servers and the first tunnel client, wherein the first tunnel connection request includes authentication information; and
    authorizing the first tunnel connection request using the authentication information prior to assigning the first IP address for the first tunnel.

6. The method of claim 1, further comprising:
    acquiring a certificate for the hostname to secure an internal connection between a web server running on the first one of the plurality of edge servers and a tunnel service on the first one of the plurality of edge servers that services the first tunnel.

7. The method of claim 1, further comprising:
    receiving, at a third one of the plurality of edge servers from a second tunnel client residing on a second origin server, a second tunnel connection request that requests a second tunnel be established between the third one of the plurality of edge servers and the second tunnel client, wherein the second tunnel connection request identifies the hostname that is to be tunneled;
    determining that the first tunnel for the hostname exists that connects the first one of the plurality of edge servers to the first origin server;
    assigning a second IP address for the second tunnel;
    causing a Domain Name System (DNS) record to be added or changed that associates the hostname with the assigned second IP address for the second tunnel; and
    creating a load balancer to balance traffic across the first tunnel and the second tunnel.

8. The method of claim 7, further comprising:
    receiving, from the first tunnel client and the second tunnel client, statistics of the first origin server and the second origin server respectively, wherein the load balancer balances traffic across the first tunnel and the second tunnel using the statistics received from the first tunnel client and the second tunnel client.

9. A non-transitory machine-readable storage medium that provides instructions that, when executed by a processor, cause said processor to perform operations comprising:
    assigning a first IP address for a first tunnel between a first one of a plurality of edge servers of a distributed edge compute and routing service and a first tunnel client residing on a first origin server;
    causing a Domain Name System (DNS) record to be added or changed that associates a hostname to be tunneled with the assigned first IP address for the first tunnel;
    causing routing rules to be installed in the plurality of edge servers to reach the first one of the plurality of edge servers for the tunneled hostname;
    receiving, at the first one of the plurality of edge servers, a request for an action to be performed on a resource of the tunneled hostname handled by the first origin server, wherein the first one of the plurality of edge servers receives the request from a second one of the plurality of edge servers that received the request from a client network application, and wherein the second one of the plurality of edge servers is not connected to the first origin server for the tunneled hostname; and transmitting the request from the first one of the plurality of edge servers to the first origin server over the first tunnel.

10. The non-transitory machine-readable storage medium of claim 9, wherein prior to transmitting the request over the first tunnel, converting the request to an HTTP/2 request.

11. The non-transitory machine-readable storage medium of claim 9, further comprising:

receiving a first tunnel connection request that requests the first tunnel be established between the first one of the plurality of edge servers and the first tunnel client, wherein the first one of the plurality of edge servers is selected to receive the first tunnel connection request based on the first one of the plurality of edge servers being closest to the first origin server as determined by an implementation of an anycast protocol.

12. The non-transitory machine-readable storage medium of claim 11, wherein the first tunnel connection request is received in response to a user interaction with an interface element of a graphical user interface.

13. The non-transitory machine-readable storage medium of claim 9, further comprising:

receiving a first tunnel connection request that requests the first tunnel be established between the first one of the plurality of edge servers and the first tunnel client, wherein the first tunnel connection request includes authentication information; and authorizing the first tunnel connection request using the authentication information prior to assigning the first IP address for the first tunnel.

14. The non-transitory machine-readable storage medium of claim 9 that further provides instructions that, when executed by the processor, cause said processor to further perform operations comprising:

acquiring a certificate for the hostname to secure an internal connection between a web server running on the first one of the plurality of edge servers and a tunnel service on the first one of the plurality of edge servers that services the first tunnel.

15. The non-transitory machine-readable storage medium of claim 9 that further provides instructions that, when executed by the processor, cause said processor to further perform operations comprising:

receiving, at a third one of the plurality of edge servers from a second tunnel client residing on a second origin server, a second tunnel connection request that requests a second tunnel be established between the third one of the plurality of edge servers and the second tunnel client, wherein the second tunnel connection request identifies the hostname that is to be tunneled;

determining that the first tunnel for the hostname exists that connects the first one of the plurality of edge servers to the first origin server;

assigning a second IP address for the second tunnel;

causing a Domain Name System (DNS) record to be added or changed that associates the hostname with the assigned second IP address for the second tunnel; and creating a load balancer to balance traffic across the first tunnel and the second tunnel.

16. The non-transitory machine-readable storage medium of claim 15 that further provides instructions that, when executed by the processor, cause said processor to further perform operations comprising:

receiving, from the first tunnel client and the second tunnel client, statistics of the first origin server and the second origin server respectively, wherein the load balancer balances traffic across the first tunnel and the second tunnel using the statistics received from the first tunnel client and the second tunnel client.

17. An apparatus, comprising:

a set of one or more processors;

a non-transitory machine-readable storage medium that stores instructions that, when executed by the set of processors, is to perform operations including:

assign a first IP address for a first tunnel between a first one of a plurality of edge servers of a distributed edge compute and routing service and a first tunnel client residing on a first origin server;

cause a Domain Name System (DNS) record to be added or changed that associates a hostname to be tunneled with the assigned first IP address for the first tunnel;

cause routing rules to be installed in the plurality of edge servers to reach the first one of the plurality of edge servers for the tunneled hostname;

receive, at the first one of the plurality of edge servers, a request for an action to be performed on a resource of the tunneled hostname handled by the first origin server, wherein the first one of the plurality of edge servers is to receive the request from a second one of the plurality of edge servers that received the request from a client network application, and wherein the second one of the plurality of edge servers is not to be connected to the first origin server for the tunneled hostname; and transmit the request from the first one of the plurality of edge servers to the first origin server over the first tunnel.

18. The apparatus of claim 17, wherein the non-transitory machine-readable storage medium further stores instructions that, when executed by the set of processors, cause the set of processors to further to convert the request to an HTTP/2 request prior to transmission of the request over the first tunnel.

19. The apparatus of claim 17, wherein the non-transitory machine-readable storage medium further stores instructions that, when executed by the set of processors, cause the set of processors to:

receive a first tunnel connection request that requests the first tunnel be established between the first one of the plurality of edge servers and the first tunnel client, wherein the first one of the plurality of edge servers is to be selected to receive the first tunnel connection request based on the first one of the plurality of edge servers being closest to the first origin server as determined by an implementation of an anycast protocol.

20. The apparatus of claim 19, wherein the first tunnel connection request is received in response to a user interaction with an interface element of a graphical user interface.

21. The apparatus of claim 17, wherein the non-transitory machine-readable storage medium further stores instructions that, when executed by the set of processors, cause the set of processors to:

receive a first tunnel connection request that requests the first tunnel be established between the first one of the plurality of edge servers and the first tunnel client, wherein the first tunnel connection request is to include authentication information; and authorize the first tunnel connection request using the authentication information prior to assigning the first IP address for the first tunnel.

22. The apparatus of claim 17, wherein the non-transitory machine-readable storage medium further stores instructions that, when executed by the set of processors, cause the set of processors to:

acquire a certificate for the hostname to secure an internal connection between a web server running on the first one of the plurality of edge servers and a tunnel service on the first one of the plurality of edge servers that services the first tunnel.

23. The apparatus of claim 17, wherein the non-transitory machine-readable storage medium further stores instructions that, when executed by the set of processors, cause the set of processors to:

receive, at a third one of the plurality of edge servers from a second tunnel client residing on a second origin server, a second tunnel connection request that requests a second tunnel be established between the third one of the plurality of edge servers and the second tunnel client, wherein the second tunnel connection request is to identify the hostname that is to be tunneled;

determine that the first tunnel for the hostname exists that connects the first one of the plurality of edge servers to the first origin server;

assign a second IP address for the second tunnel;

cause a Domain Name System (DNS) record to be added or changed that associates the hostname with the assigned second IP address for the second tunnel; and create load balancer to balance traffic across the first tunnel and the second tunnel.

24. The apparatus of claim 23, wherein the non-transitory machine-readable storage medium further stores instructions that, when executed by the set of processors, cause the set of processors to:

receive, from the first tunnel client and the second tunnel client, statistics of the first origin server and the second origin server respectively, wherein the load balancer is to balance traffic across the first tunnel and the second tunnel using the statistics received from the first tunnel client and the second tunnel client.

\* \* \* \* \*